United States Patent
Kuo et al.

(10) Patent No.: US 11,863,916 B2
(45) Date of Patent: Jan. 2, 2024

(54) COLOR CORRECTION METHOD AND IMAGE CORRECTION APPARATUS

(71) Applicant: ALTEK SEMICONDUCTOR CORPORATION, Hsinchu (TW)

(72) Inventors: Yu-Chen Kuo, Hsinchu (TW); Po-Han Tseng, Hsinchu (TW); Kuo-Ming Lai, Hsinchu (TW)

(73) Assignee: ALTEK SEMICONDUCTOR CORPORATION, Hsinchu (TW)

( * ) Notice: Subject to any disclaimer, the term of this patent is extended or adjusted under 35 U.S.C. 154(b) by 102 days.

(21) Appl. No.: 17/585,603

(22) Filed: Jan. 27, 2022

(65) Prior Publication Data

US 2023/0239444 A1   Jul. 27, 2023

(51) Int. Cl.
*G06K 9/00* (2022.01)
*H04N 9/64* (2023.01)
*H04N 23/84* (2023.01)

(52) U.S. Cl.
CPC .......... *H04N 9/646* (2013.01); *H04N 23/843* (2023.01)

(58) Field of Classification Search
CPC .......... G06T 15/20; G06T 19/006; G06T 2207/10012; G06T 2207/10052; G06T 3/20; G06T 3/40; G06T 3/60; G06T 2207/10024; G06T 7/80; G06T 7/90; G06T 11/001; G06T 2207/10016; G06T 7/0004; G06T 7/001; G06T 2207/20076; G06T 2207/20081; G06T 5/009; G06T 11/60; G06T 2207/30121; G06T 2207/30144; G06T 2207/30168; G06T 2207/30204; G06T 2207/30241; G06T 2207/30244; G06T 7/0008; G06T 7/251; G06T 7/74

See application file for complete search history.

(56) References Cited

U.S. PATENT DOCUMENTS

| | | | |
|---|---|---|---|
| 2005/0036668 A1* | 2/2005 | McLennan | G06T 7/0012 382/128 |
| 2012/0309520 A1* | 12/2012 | Everett | A63F 13/213 463/31 |

FOREIGN PATENT DOCUMENTS

| | | |
|---|---|---|
| CN | 101366019 A | 2/2009 |
| CN | 111340734 A | 6/2020 |
| CN | 111861893 A | 10/2020 |
| CN | 112887693 A | 6/2021 |
| CN | 113393540 A | 9/2021 |
| CN | 113784101 A | 12/2021 |
| CN | 113905183 A | 1/2022 |
| TW | 201208363 A1 | 2/2012 |

* cited by examiner

Primary Examiner — Alex Kok S Liew
(74) Attorney, Agent, or Firm — Winston Hsu

(57) ABSTRACT

A color correction method is applied to an image correction apparatus having an image sensor, and includes searching a color deviation area within a detection image, analyzing the detection image to estimate a correction color value of the color deviation area, and calibrating the color deviation area by the correction color value to generate a calibrated detection image without color deviation.

10 Claims, 4 Drawing Sheets

COLOR CORRECTION METHOD AND IMAGE CORRECTION APPARATUS

BACKGROUND OF THE INVENTION

1. Field of the Invention

The present invention relates to a color correction method and an image correction apparatus, and more particularly, to a color correction method for color fringe reduction and a related image correction apparatus.

2. Description of the Prior Art

With the advanced technology, the high-resolution images have greater details and are widespread used in a variety of image apparatuses. However, the high-resolution images may have some unexpected error, such as the color fringe, which results in worse experience. The color fringe is a defocused purple ghost rimming parts in the edge of captured objects or high frequency of the image, which is generated due to chromatic aberration of the lens in the image apparatuses. A conventional solution of eliminating the color fringe requires manual operation by the user. For example, the user has to manually indicate the color fringe in the image, and manually input a control command to replace the color fringe by grey color. Thus, design of a color correction method capable of automatically detecting and correcting the color fringe is an important issue in the image apparatus industry.

SUMMARY OF THE INVENTION

The present invention provides a color correction method for color fringe reduction and a related image correction apparatus for solving above drawbacks.

According to the claimed invention, a color correction method applied to an image sensor includes searching a color deviation area within a detection image, analyzing the detection image to estimate a correction color value of the color deviation area, and calibrating the color deviation area by the correction color value to generate a calibrated detection image without color deviation.

According to the claimed invention, the color correction method further includes analyzing color distribution of the detection image to estimate the correction color value. Besides, the color correction method further includes identifying a specific object within the detection image via an object identification technique, determining whether the color deviation area conforms to a pattern range of the specific object, and analyzing color distribution of the specific object to estimate the correction color value when the color deviation area conforms to the pattern range. When the color deviation area does not conform to the pattern range, the color correction method analyzes color distribution of the detection image to estimate the correction color value.

According to the claimed invention, the color correction method further includes establishing a mask by removing pixel values of the color deviation area, and filling the mask via the correction color value to generate the calibrated detection image. In addition, the color correction method further includes acquiring a plurality of coordinates of the color deviation area, and replacing initial pixel values of the plurality of coordinates by the correction color value to generate the calibrated detection image.

According to the claimed invention, an image correction apparatus includes an image sensor and an operation processor. The image sensor is adapted to acquire a detection image. The operation processor is electrically connected to the image sensor. The operation processor is adapted to search a color deviation area within a detection image, analyze the detection image to estimate a correction color value of the color deviation area, and calibrate the color deviation area by the correction color value to generate a calibrated detection image without color deviation.

According to the claimed invention, the operation processor is further adapted to analyze color distribution of the detection image to estimate the correction color value. The operation processor is further adapted to identify a specific object within the detection image via an object identification technique, determine whether the color deviation area conforms to a pattern range of the specific object, and analyze color distribution of the specific object to estimate the correction color value when the color deviation area conforms to the pattern range. The operation processor is further adapted to analyze color distribution of the detection image for estimating the correction color value when the color deviation area does not conform to the pattern range.

According to the claimed invention, the operation processor is further adapted to establish a mask by removing pixel values of the color deviation area, and fill the mask via the correction color value to generate the calibrated detection image. The operation processor is further adapted to acquire a plurality of coordinates of the color deviation area, and replace initial pixel values of the plurality of coordinates by the correction color value to generate the calibrated detection image.

The color correction method and the image correction apparatus of the present invention can automatically search the color deviation area within the detection image, and calibrate the color deviation area via the correction color value to show expected color of the detection image. The present invention may utilize a machine learning algorithm or any available color analysis algorithm with the same or similar efficiency to search the color deviation area and acquire the correction color value of the color deviation area. Therefore, the color correction method of the present invention can automatically search and calibrate the color deviation area inside the detection image to recover the expected color of the detection image, so that the image correction apparatus and the matched image capturing apparatus can provide preferred color performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
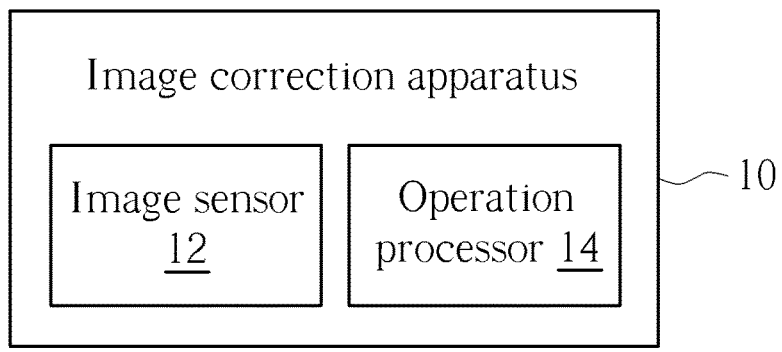
FIG. 1 is a functional block diagram of an image correction apparatus according to an embodiment of the present invention.
Figure 2:
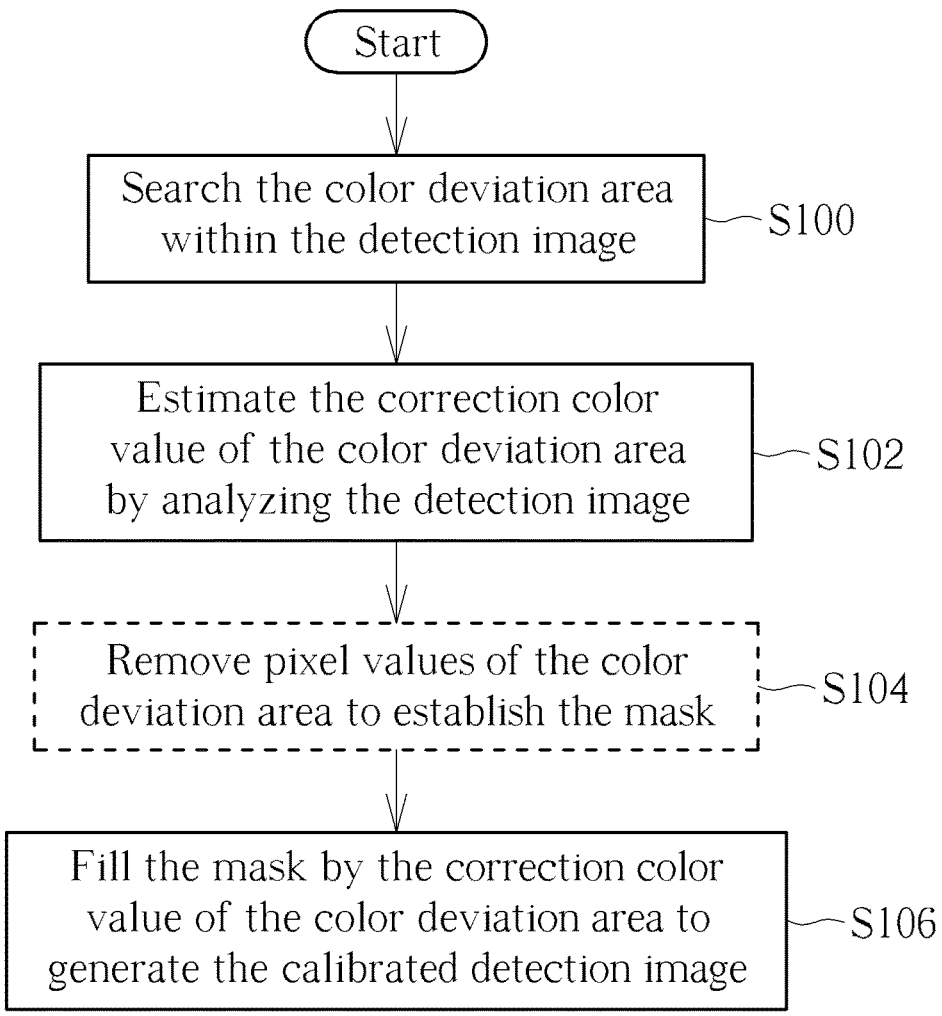
FIG. 2 is a flow chart of a color correction method according to the embodiment of the present invention.

Please refer to FIG. 1 and FIG. 2. FIG. 1 is a functional block diagram of an image correction apparatus 10 according to an embodiment of the present invention. FIG. 2 is a flow chart of a color correction method according to the embodiment of the present invention. The image correction apparatus 10 can determine whether a detection image acquired by an image capturing apparatus has a color fringe, and further automatically calibrate the color fringe via corrected and expected color when the detection image has the color fringe. The image capturing apparatus can be installed in an indoor place or an outdoor place. The image correction apparatus 10 may be separated from the image capturing apparatus, or may be a part of the image capturing apparatus. The image correction apparatus 10 can include an image sensor 12 and an operation processor 14. The image sensor 12 can directly capture the detection image, or can receive the detection image from an external apparatus in a wire manner or in a wireless manner. The operation processor 14 can be electrically connected to the image sensor 12 and used to execute the color correction method of the present invention. The color correction method illustrated in FIG. 2 can be suitable for the image correction apparatus 10 shown in FIG. 1.

Figure 3:
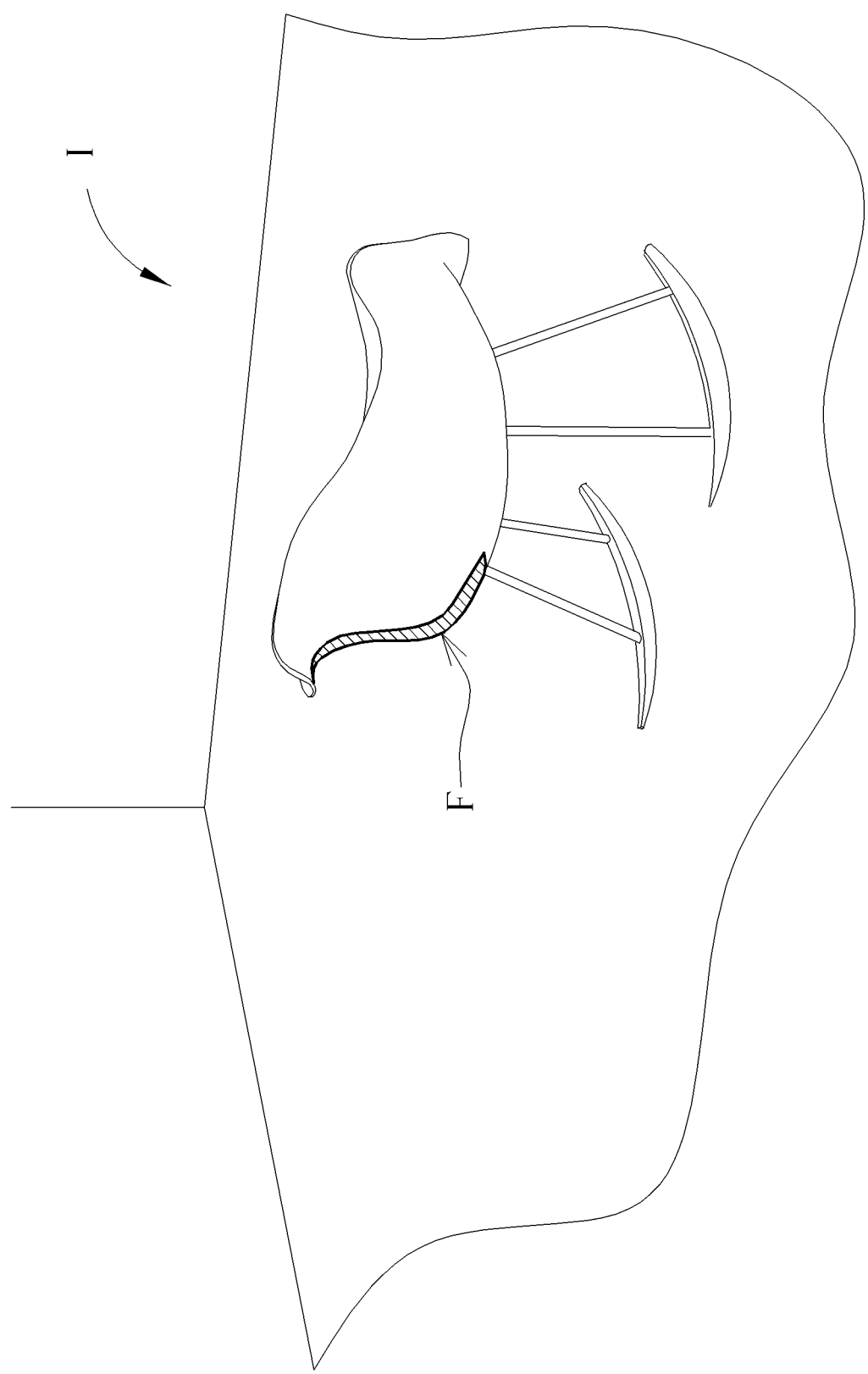
FIG. 3 to FIG. 5 are diagrams of the detection image in different operation modes according to the embodiment of the present invention.
Figure 4:
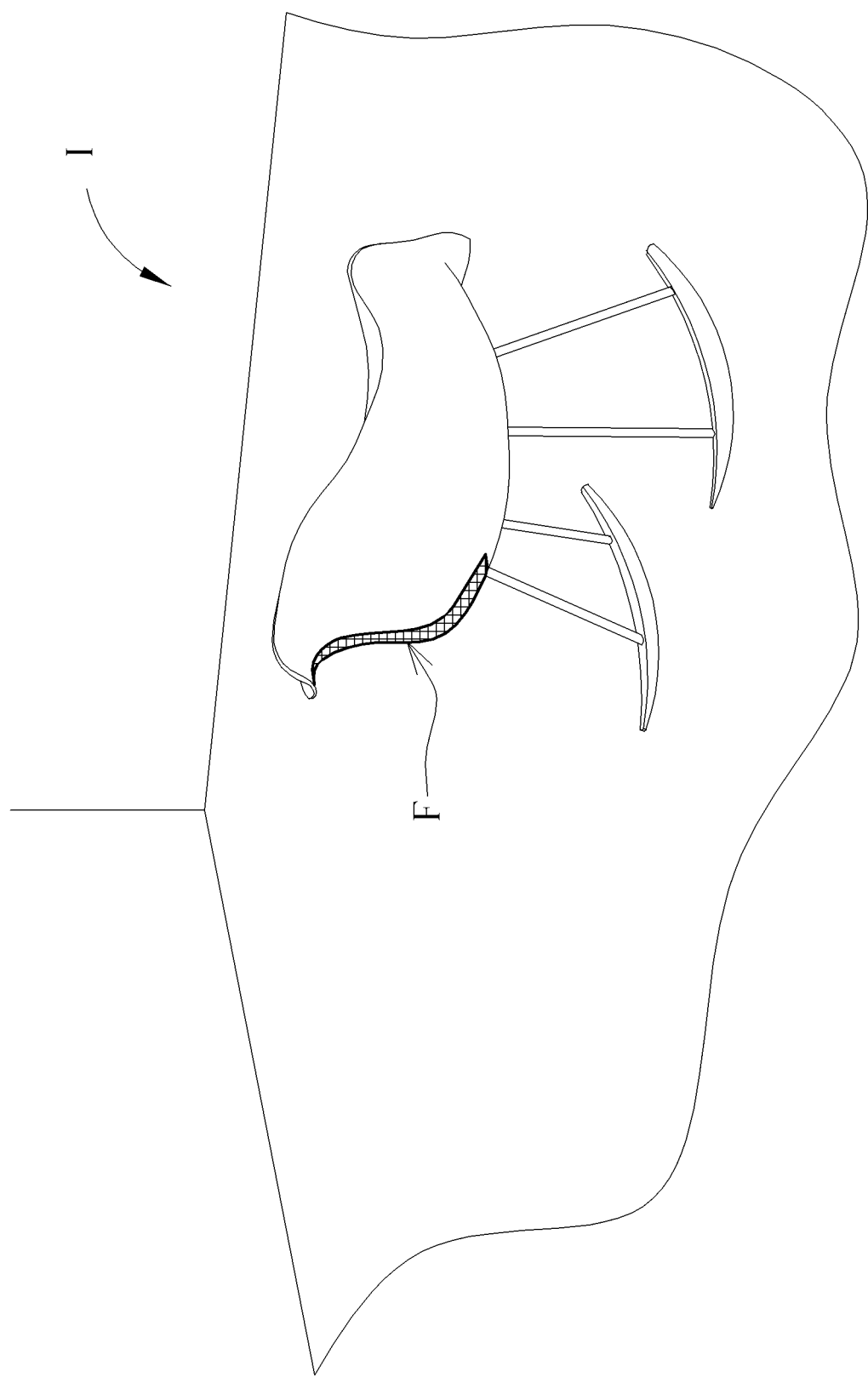
Figure 5:
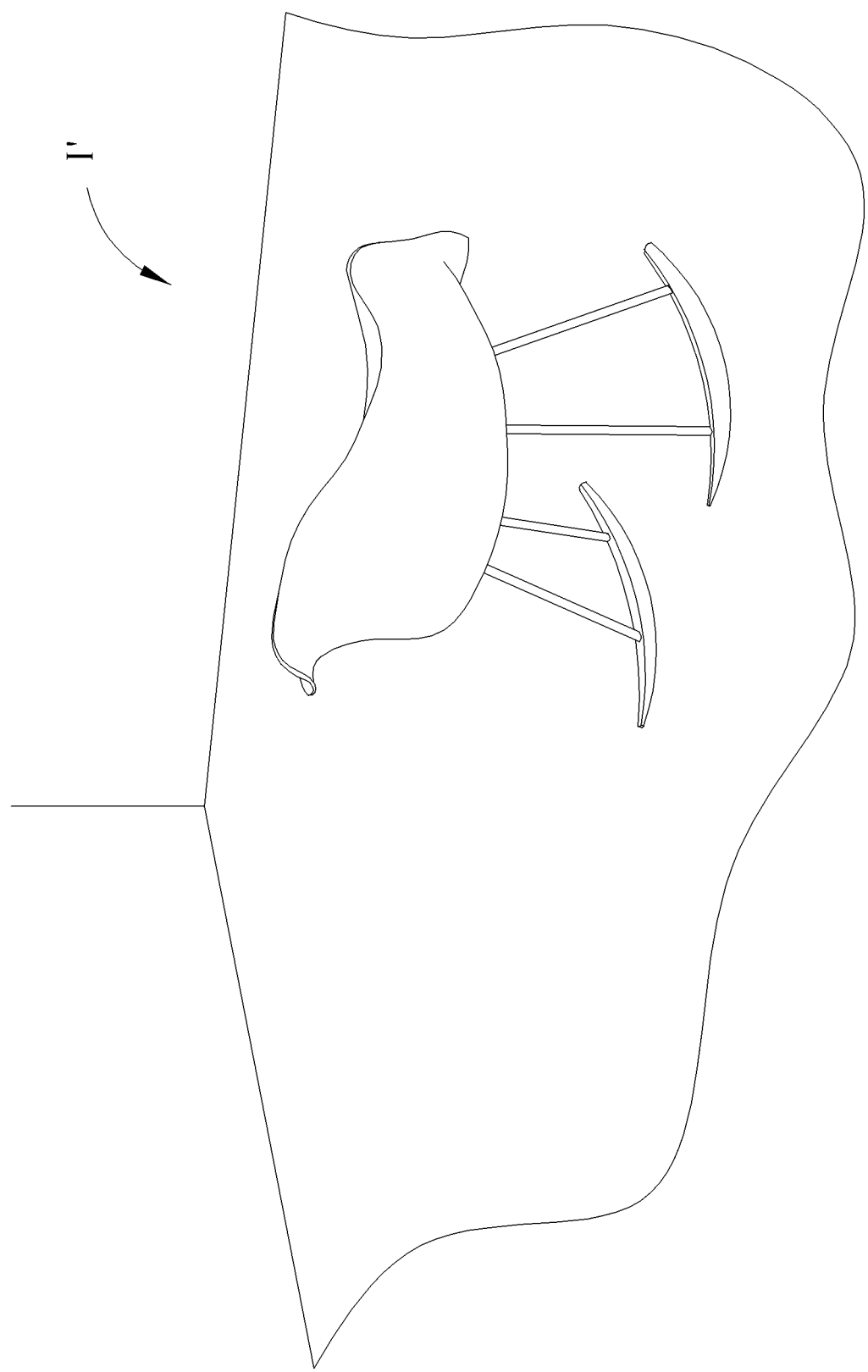

Please refer to FIG. 2 to FIG. 5. FIG. 3 to FIG. 5 are diagrams of the detection image I in different operation modes according to the embodiment of the present invention. First, the color correction method can execute step S100 to acquire the detection image I and search a color deviation area F within the detection image I. The color deviation area F may be the color fringe with specific color appeared in a border between a high illuminate area and a low illuminate area within the detection image I. As shown in FIG. 3, if the red chair is put on the white floor, the border between the red chair and the white floor may show the color deviation area F with the purple fringe (which is drawn by oblique stripes). Generally, step S100 can search the color deviation area F within the whole detection image I; however, an actual application is not limited to the above-mentioned embodiment, and depends on a design demand.

For example, a region of interest (which is not shown in the figures) may be set within the detection image I in a manual manner or in an automatic manner, and step S100 may search the color deviation area F only within the region of interest, for decreasing an execution period and increasing an execution efficiency. The manual manner may represent a user can utilize an input interface, such as the mouse or the keyboard, to draw the region of interest in a specific area inside the detection image I. The specific area may be any area where the color fringe is frequently appeared, or any area where the color fringe is unallowably appeared. The automatic manner may represent that the image correction apparatus 10 can analyze usual or unusual motion of objects to decide the region of interest, or analyze any place where a specific object is appeared to define the region of interest inside the detection image I.

Then, step S102 can be executed to estimate a correction color value of the color deviation area F by analysis of the detection image I. In step S102, the color correction method can analyze color distribution of the whole detection image I, such as detecting variation of lines and colors in the detection image I via edge detection technique, and then estimate the correction color value of the color deviation area F in accordance with a trend of the color variation. Further, the color correction method may identify the specific object inside the detection image I via object identification technique, and determine whether a position of the color deviation area F conforms to a pattern range of the specific object. For example, if the specific object is the red chair put on the white floor, and the color deviation area F is located on the border between the red chair and the white floor, the color correction method can decide the color deviation area F conforms to the pattern range of the specific object, and then analyze the color distribution of the specific object to acquire the correction color value of the color deviation area F. If the color deviation area F does not conform to the pattern range of the specific object, which means the color deviation area F is not on the border between the red chair and the white floor, the color correction method can analyze the color distribution of the whole detection image I to acquire the correction color value of the color deviation area F.

After that, step S104 can be optionally executed to remove pixel values of the color deviation area F inside the detection image I to establish a mask M; the mask M is drawn by plaid to indicate empty pixels, as shown in FIG. 4. Final, step S106 can be executed to fill the mask M by the correction color value of the color deviation area F estimated in step S102 when a position and a range of the mask M are confirmed, so as to generate a calibrated detection image I'. As shown in FIG. 5, the border between the red chair and the white floor inside the calibrated detection image I' is drawn without the oblique stripes, and there is no color fringe appeared on the foresaid border to indicate that the color fringe is eliminated. If the color correction method does not execute step S104, the color correction method can record a plurality of coordinates of pixels in the color deviation area F, and replace initial pixel values of the foresaid pixels of the plurality of coordinates (which means wrong color of the purple fringe) by the correction color value estimated in step S102 for generating the calibrated detection image I'.

In conclusion, the color correction method and the image correction apparatus of the present invention can automatically search the color deviation area within the detection image, and calibrate the color deviation area via the correction color value to show expected color of the detection image. The present invention may utilize a machine learning algorithm or any available color analysis algorithm with the same or similar efficiency to search the color deviation area and acquire the correction color value of the color deviation area. Therefore, the color correction method of the present invention can automatically search and calibrate the color deviation area inside the detection image to recover the expected color of the detection image, so that the image correction apparatus and the matched image capturing apparatus can provide preferred color performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A color correction method applied to an image sensor, comprising:
   setting a region of interest within a detection image acquired by the image sensor and searching a color deviation area within the region of interest;
   identifying a specific object inside the detection image via an object identification technique;
   determining whether the color deviation area conforms to a contour of a pattern range of the specific object;
   utilizing edge detection technique to analyze color variation of the specific object so as to estimate a correction color value of the color deviation area when the color deviation area conforms to the contour; and calibrating the color deviation area by the correction color value to generate a calibrated detection image without color deviation.

2. The color correction method of claim 1, further comprising:

analyzing color distribution of the detection image to estimate the correction color value.

3. The color correction method of claim 1, further comprising:

analyzing color distribution of the detection image to estimate the correction color value when the color deviation area does not conform to the pattern range.

4. The color correction method of claim 1, further comprising:

establishing a mask by removing pixel values of the color deviation area; and filling the mask via the correction color value to generate the calibrated detection image.

5. The color correction method of claim 1, further comprising:

acquiring a plurality of coordinates of the color deviation area; and replacing initial pixel values of the plurality of coordinates by the correction color value to generate the calibrated detection image.

6. An image correction apparatus, comprising:

an image sensor adapted to acquire a detection image; and an operation processor electrically connected to the image sensor, the operation processor being adapted to set a region of interest within a detection image acquired by the image sensor and search a color deviation area within the region of interest, identify a specific object inside the detection image via an object identification technique, determine whether the color deviation area conforms to a contour of a pattern range of the specific object, utilizing edge detection technique to analyze color variation of the specific object so as to estimate a correction color value of the color deviation area when the color deviation area conforms to the contour, and calibrate the color deviation area by the correction color value to generate a calibrated detection image without color deviation.

7. The image correction apparatus of claim 6, wherein the operation processor is further adapted to analyze color distribution of the detection image to estimate the correction color value.

8. The image correction apparatus of claim 6, wherein the operation processor is further adapted to analyze color distribution of the detection image for estimating the correction color value when the color deviation area does not conform to the pattern range.

9. The image correction apparatus of claim 6, wherein the operation processor is further adapted to establish a mask by removing pixel values of the color deviation area, and fill the mask via the correction color value to generate the calibrated detection image.

10. The image correction apparatus of claim 6, wherein the operation processor is further adapted to acquire a plurality of coordinates of the color deviation area, and replace initial pixel values of the plurality of coordinates by the correction color value to generate the calibrated detection image.

* * * * *